Oct. 20, 1931.     N. S. YOST     1,828,724

ALTERNATING CURRENT MOTOR

Filed Aug. 6, 1928

Inventor

Norman S. Yost

By Braselton, Whitcomb & Davies
Attorneys

Patented Oct. 20, 1931

1,828,724

UNITED STATES PATENT OFFICE

NORMAN S. YOST, OF HOWELL, MICHIGAN, ASSIGNOR TO HOWELL ELECTRIC MOTORS COMPANY, OF HOWELL, MICHIGAN, A CORPORATION OF MICHIGAN

ALTERNATING CURRENT MOTOR

Application filed August 6, 1928. Serial No. 297,726.

This invention concerns electrical apparatus, for instance, motors or other devices adapted to be operated from a source of alternating current energy.

As is well known, an induction motor will not start under load when connected to a single phase source of alternating current and it requires for its successful starting operation the use of phase modifying devices for supplying a polyphase alternating current effect to the motor windings.

The present invention relates to the provision of an improved single phase alternating current motor having considerable starting torque but which will operate with a high degree of efficiency under normal load conditions, and contemplates in an embodiment thereof the provision of means adapted to produce polyphase currents for starting the motor and has for a particular object, the provision of voltage responsive means adapted to render ineffective the polyphase current producing means under predetermined conditions.

The invention further embraces the utilization of electro-responsive means rendered effective by voltage variations in an electrical circuit adapted to control the effect of the polyphase current producing means under predetermined conditions.

Further objects and advantages are within the scope of this invention such as relate to the arrangement, operation and function of the related elements of the system and to various details of construction, to combinations of parts and to elements per se, as well as numerous other features as will be apparent from a consideration of the specification and drawings of a form of the invention, which may be preferred, in which.

In order to effect the operation of an induction motor the current traversing the primary windings should differ somewhat in phase and the phase displacement can be obtained by means of capacitance, resistance, inductive reactances or other suitable phase modifying means. These devices modify the relation existing in the current between the windings producing the polyphase current effects required for the successful starting of the motor under load.

Figure 1:
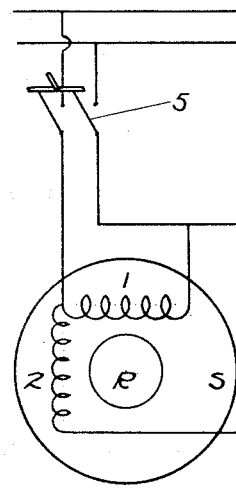
Figure 1 is a diagrammatic view illustrating an induction motor incorporating a polyphase current producing means.

Referring particularly to Figure 1 of the drawings, I have represented a motor having a stator S and a rotor R, the stator having a main winding 1 and an auxiliary winding 2, the main or "running" winding and the auxiliary or "starting" winding 2 energized by an alternating current source by means of a suitable switch 5. These windings are substantially arranged on a stator member having a suitable angular relationship as the energizing windings used in a two phase motor. In this form of the invention I employ as a phase modifying means a condenser 3 of a suitable capacitance for the starting operation of the motor which is connected in series with the auxiliary winding 2, and the terminals of the auxiliary winding and condenser circuit may be connected across the main winding 1 as herein illustrated.

I have found that a condenser of the electrolytic type being inexpensive to manufacture, serves the purpose very well when utilized during comparatively short periods of time during the starting operation of the motor. The capacitance produces a leading current in the circuit of the auxiliary winding 2 which functions as a phase modifying means between the motor energizing windings producing the polyphase current effects required for the successful starting operation of the motor with the main winding alone under load. As the motor produces the required torque under normal running conditions, it is desirable to render ineffective the phase modifying means or the auxiliary starting circuit and for that purpose I have provided the manually operated switch 8.

Figure 2:
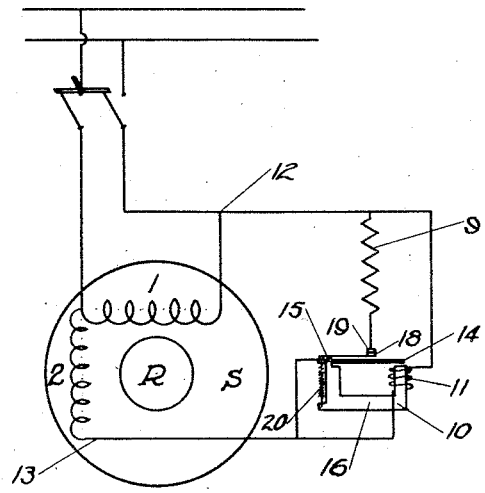
Figure 2 is a view similar to Figure 1 showing another arrangement of the polyphase current producing means incorporating an automatic controlling device.

In the embodiment illustrated in Figure 2 I have employed an automatic means for rendering the starting circuit ineffective under running conditions. In this embodiment I use two windings only and a resistance 9 in series with the auxiliary or starting winding of the motor. The resistance 9 acts in this case as phase modifying means for the current in the starting winding producing the polyphase current effects that are required for the successful starting operation of the motor under load. In order to disconnect the starting winding when the motor has reached its normal running speed several means have been used, as centrifugal switches and other means, responsive to the speed of the motor which are somewhat unsatisfactory due to the unreliability of their operation, or the great expense incurred in their manufacture or when three windings are employed there is a tendency to waste current and more than one phase modifying means would be used. In order to overcome these difficulties and to obtain this result I have utilized a relay of the voltage responsive type adapted to disconnect or render ineffective the phase modifying means or the starting circuit after the motor has been started. The relay 10 is illustrated diagrammatically and comprises an energizing winding 11 wound of comparatively fine wire and connected across terminals 12 and 13 of the stator windings as illustrated in Figure 2. The armature 14 is pivoted at 15 and is adapted to be attracted by the magnetic core 16 energized by windings 11. The armature 14 carries a movable contact 18 adapted for cooperation with terminal 19 of the resistance 9, the contact and terminal being normally held in closed position by means of a spring 20.

In the operation of this type of motor it has been found that when the motor is being started, the difference of potential across the terminals of the auxiliary winding is comparatively low, but whenever the speed of the motor is reached, the potential across the terminals of this winding is materially increased. In this form of my invention the windings of the relay are connected across the terminals of the main and auxiliary stator windings and are energized thereby. During the starting action of the motor the voltage applied to the relay windings is not sufficient to energize the magnetic core 16 to attract armature 14, but as the motor is coming up to speed the voltage is increased with the corresponding increase in the energization of the magnetic core, attracting armature 14 whereby the movable contact 18 is separated from its cooperating contact terminal 19 functioning to disconnect the starting circuit of the motor from the current supply. Under the normal operation of the motor, the voltage applied to the relay windings is a combination of line voltage and the voltage induced in the auxiliary winding by the rotating magnetic field and such voltage is sufficient to maintain the relay armature 14 in its attracted position thus acting to separate the relay contacts which render the phase modifying means ineffective.

Figure 3:
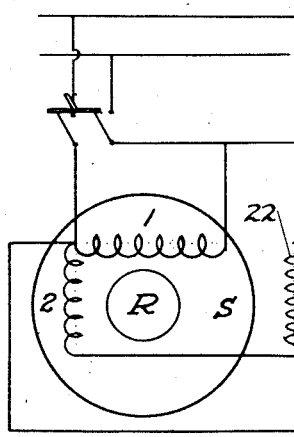
Figure 3 is a diagrammatic view showing still a further arrangement of polyphase current producing means and its controlling means.

In the form of the invention shown in Figure 3 I have shown an inductive reactance 22 as a phase modifying means for the auxiliary or starting winding of the motor. The reactance 22 is connected across the terminals of the main and auxiliary windings, and is adapted to be disconnected from the current supply by means of a voltage responsive relay 25. The relay employed in this circuit is connected across the auxiliary winding and comprises an energizing coil 26, an armature 27 and core 28. When the motor has attained a running speed which is accompanied by an increase in voltage across the auxiliary winding, the voltage becomes sufficient to attract the armature 27 which operates to separate the contacts 29 and disconnect the reactance, and due to the voltage induced by the rotating magnetic field the armature is held in its attracted position, whenever the motor is under normal running operation.

Figure 4:
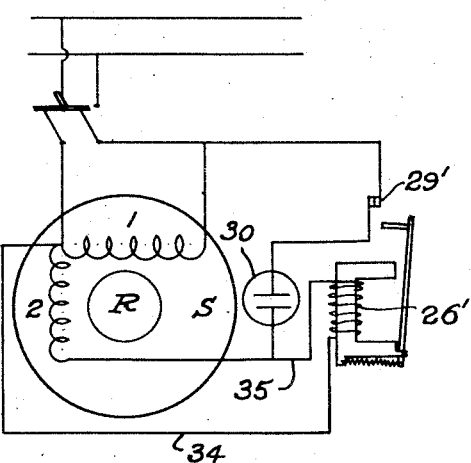
Figure 4 is a view showing still another arrangement of the system incorporating an automatic control therefor.

In the form of the invention as shown in Figure 4 I have employed a condenser 30 as a phase modifying means which is adapted to be disconnected from the current supply of the motor by means of a relay similar to that illustrated in Figure 3, the motor comprising similar elements to those shown and described in connection with the embodiment of Fig. 1, the relay windings being connected across the auxiliary winding 2 by suitable leads 34 and 35 and consequently energized by the voltage across said winding. This voltage, as has been pointed out above, is comparatively low when the motor is being started but a condenser being in circuit, an increase takes place when the motor accelerates and approaches running speed. The relay winding 26' thereupon opens the switch 29' and maintains such open position during the normal running operation.

I have found that a condenser of the electrolytic type being inexpensive to manufacture, serves the purpose very well when utilized during comparatively short periods of time during the starting operation of the motor.

Where the condenser is energized during the running operation of the motor by the current taken by the energizing winding of the relay, this current being of small value, acts as an exciting means for the condenser plates preventing the deterioration of the dielectric film, lengthening the life of the condenser and improving the electrical characteristics of the same.

It is apparent that, within the scope of the invention modifications and different arrangements may be made other than is herein disclosed, and the present disclosure is illustrative merely, the invention comprehending all variations thereof.

What I claim is:

1. In combination, a single phase motor having a plurality of windings; a phase advancing means; a circuit for one of said windings adapted to be connected across a source of current; another of the windings being connected with said phase advancing means, said winding and said phase advancing means forming a parallel circuit with said first mentioned winding; and means responsive to the voltage variations of the winding connected to the phase advancing means for rendering ineffective the second winding and the phase advancing means.

2. In combination, a single phase motor having a plurality of windings; a phase advancing means; one of said windings connected across the source of power; another of said windings being connected in series with said phase advancing means, both said last mentioned winding and said phase advancing means arranged to be connected for energization during starting; and electro-responsive means rendered effective by voltage variations in the winding connected with the phase advancing means to render ineffective said winding and phase advancing means.

3. In an electrical system, the combination of a source of current supply, and a single phase motor comprising a main winding; and an auxiliary winding; a capacitance; said auxiliary winding adapted to be connected with said capacitance forming with said capacitance a parallel circuit with said main winding; and means responsive to variations of the voltage in said auxiliary winding for disconnecting said capacitance.

4. In an electrical system, the combination of a source of current supply and a single phase motor comprising a main winding, and an auxiliary winding; a condenser; said auxiliary winding adapted to be connected in series with said condenser and forming a parallel circuit with said main winding; and electro magnetic means responsive to variations of the voltage in said auxiliary winding for disconnecting said auxiliary winding.

5. An induction motor having, in combination a rotor; a stator having a line winding, and an auxiliary winding; a capacitance; said auxiliary winding connected with said capacitance across the line; and electro magnetic means connected across said auxiliary winding and responsive to voltage variations therein for rendering said winding ineffective during the normal running operation of the motor.

6. An induction motor having, in combination a rotor; a stator having two windings, one of said windings adapted to be connected to a source of current; a capacitance; the other winding being connected in series with said capacitance and forming a circuit across the source of current; and means responsive to voltage variations of the winding connected with the capacitance for disconnecting said winding.

In testimony whereof, I affix my signature.

NORMAN S. YOST.